United States Patent

Gawaskar et al.

[11] Patent Number: 5,547,036
[45] Date of Patent: Aug. 20, 1996

[54] BATTERY SUPPORT DEVICE

[75] Inventors: Sadanand Gawaskar, Farmington Hills; Frank J. Norris, Sterling Heights; Joseph Vitous, Clarkston; Kevin L. Young, New Baltimore, all of Mich.

[73] Assignee: Chrysler Corporation

[21] Appl. No.: 312,245

[22] Filed: Sep. 26, 1994

[51] Int. Cl.[6] .................................................. B60R 16/04
[52] U.S. Cl. ........................ 180/68.5; 429/100; 429/163
[58] Field of Search .................... 180/68.5; 224/527, 224/902; 248/503; 429/100, 163, 175

[56] References Cited

U.S. PATENT DOCUMENTS

| | | | |
|---|---|---|---|
| D. 310,658 | 9/1990 | Balek | D13/119 |
| 1,911,401 | 5/1933 | Scott | 180/68.5 |
| 2,104,765 | 1/1938 | Saunders | 180/68.5 |
| 2,849,074 | 8/1958 | Key et al. | 180/68.5 |
| 3,437,164 | 4/1969 | Rabjohn | 180/68.5 |
| 4,252,206 | 2/1981 | Burkholder et al. | 180/68.5 |
| 4,317,497 | 3/1982 | Alt et al. | 180/68.5 |
| 4,327,809 | 5/1982 | Fenstermaker | 180/68.5 |
| 4,582,767 | 4/1986 | Morioka et al. | 429/121 |
| 4,664,994 | 5/1987 | Koike et al. | 429/163 |
| 4,754,827 | 7/1988 | Hirabayashi | 180/68.5 |
| 4,854,540 | 8/1989 | Balek | 248/503 |
| 4,892,794 | 1/1990 | Scholz | 429/72 |
| 4,976,327 | 12/1990 | Abujudom, II et al. | 180/68.2 |
| 5,082,075 | 1/1992 | Karolek et al. | 180/68.5 X |
| 5,086,860 | 2/1992 | Francis et al. | 180/68.5 |
| 5,225,292 | 7/1993 | Korinek et al. | 429/821 |
| 5,270,136 | 12/1993 | Noland | 429/175 |
| 5,278,002 | 1/1994 | Hiers | 429/175 |
| 5,390,754 | 2/1995 | Masuyama et al. | 180/68.5 |

*Primary Examiner*—Brian L. Johnson
*Attorney, Agent, or Firm*—Margaret A. Dobrowitsky

[57] ABSTRACT

A battery support device for supporting a battery in an automobile, the automobile having an engine compartment, the engine compartment having a side and a side rail. The side rail has an upper surface, the upper surface having an outer side toward the side of the engine compartment. The engine compartment further has a vertical wall extending upwardly from the outer side of the upper surface of the side rail. The battery support device includes a one-piece support tray for supporting a battery, the support tray being attachable to the side rail of the automobile so that the battery is cantilevered off the side rail.

19 Claims, 4 Drawing Sheets

BATTERY SUPPORT DEVICE

BACKGROUND OF THE INVENTION

1. Field of the Invention

The present invention relates generally to a battery support device for an automobile battery and, more particularly, to a battery support device which is adapted to support an automobile battery cantilevered off the side rail of the automobile.

2. Description of the Related Art

In current automobiles, the primary structure of the automobile includes two side rails, one for each side of the car, and several spaced-apart crossmembers joining the two side rails. Each side rail typically has a "hat-shaped" transverse cross section in which the "hat" is turned 90° C. from the norm. The side rails thus include an upper horizontal surface. In many automobiles, the automobile battery rests at least partially on the upper horizontal surface of one of the side rails in the engine compartment. Positioning the automobile battery on a side rail requires that the engine compartment have a minimum height to accommodate such positioning. However, since the industry trend is toward providing smaller automobiles, it is preferred that such a minimum height not be required. It is, therefore, desirable to have a battery support device which is able to support an automobile battery below the upper surface of the side rails to allow for a shorter engine compartment. One way of achieving such a result is by supporting the battery so that it is cantilevered off the side rail.

In addition to being able to support the battery off the side rail, it is desirable that the battery support device be easy to mount inside the engine compartment, easy to manufacture, and lightweight. One way to achieve a battery support device which is easy to manufacture and lightweight is to use a single non-metallic material for forming the device, such as a plastic. It is also advantageous to have a battery support device which is capable of having integral attachment structures for attaching various automotive parts, such as temperature sensors and air intake hoses.

It is, therefore, one object of the present invention to provide a battery support device for supporting and mounting an automobile battery inside the engine compartment of the automobile.

It is another object of the present invention to provide a battery support device which supports an automobile battery so that it allows for a short engine compartment profile.

It is yet another object of the present invention to provide a battery support device which supports an automobile battery in an engine compartment so that the battery is cantilevered off the side rail of the automobile.

It is still another object of the present invention to provide a battery support device for an automobile battery which is easy to mount inside the engine compartment, easy to manufacture, lightweight, formed with little or no metal, and capable of having integral attachment structures for attaching parts, such as, temperature sensors and air intake hoses.

SUMMARY OF THE INVENTION

To achieve the foregoing objects, the present invention is a battery support device for supporting a battery in an automobile, the automobile having an engine compartment, the engine compartment having a side and a side rail. The side rail has an upper surface, the upper surface having an outer side toward the side of the engine compartment. The engine compartment further has a vertical wall extending upwardly from the outer side of the upper surface of the side rail. The battery support device includes a one-piece support tray for supporting a battery, the support tray being attachable to the side rail of the automobile so that the battery is cantilevered off the side rail.

Other objects, structures, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
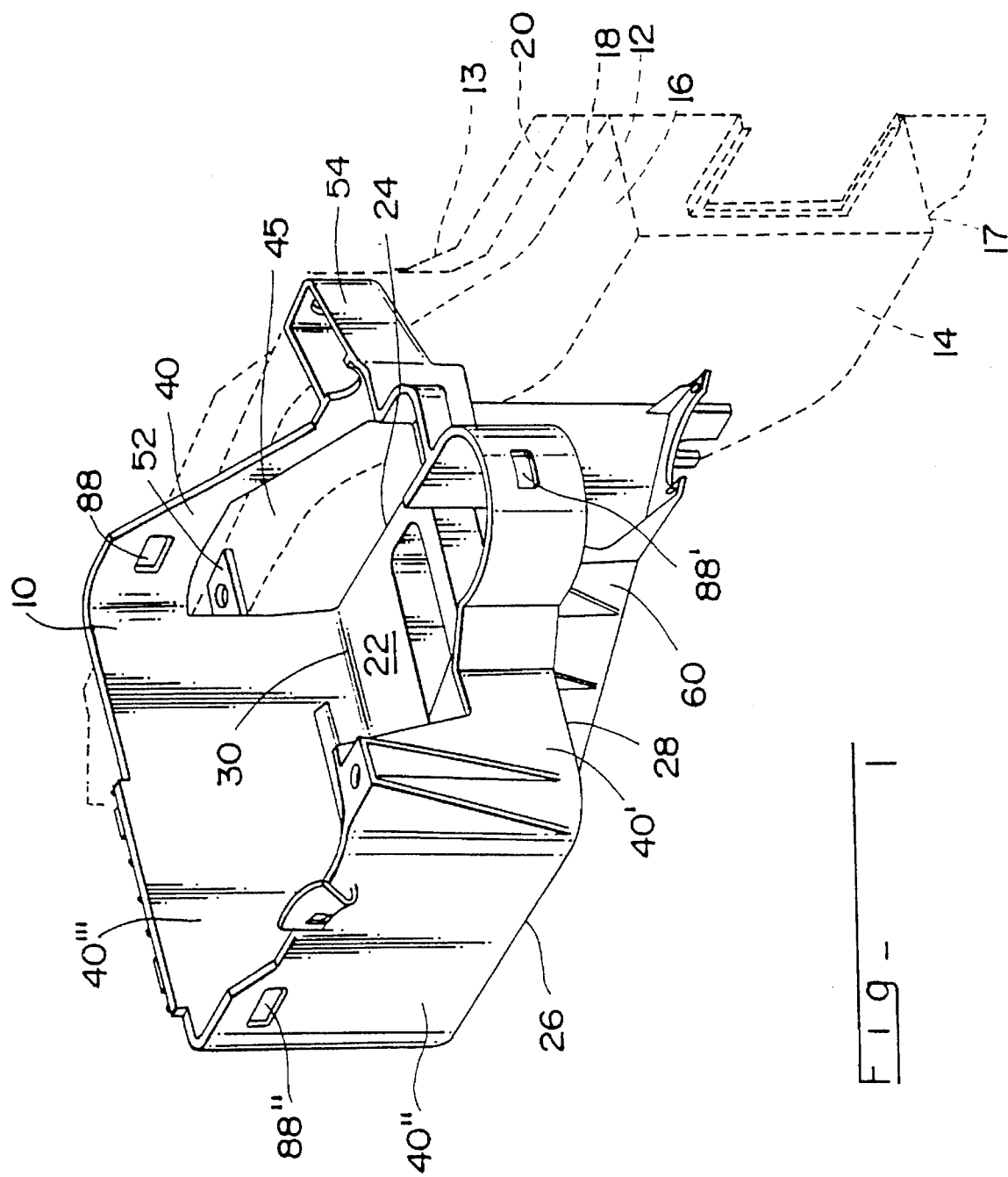
FIG. 1 is a perspective view of a battery support tray according to the present invention shown attached to a side rail of an automobile.

Referring first to FIG. 1, a one-piece support tray for supporting a battery in an automobile is generally indicated by reference numeral 10 and is shown being attached to side rail 12 (shown in phantom) in an engine compartment of an automobile. The outer left side of the engine compartment is designated by the reference numeral 13. The portion of side rail 12 shown is located in the front left area of the engine compartment, although support tray 10 may be attached to a portion of a side rail in another area of the engine compartment, e.g., the front right area. Side rail 12 has vertical surface 14, upper surface 16, and lower surface 17, both upper surface 16 and lower surface 17 being attached to vertical wall 14. Upper surface 16 has outer side 18 located toward outer left side 13 of the engine compartment. At outer side 18, the engine compartment has a vertical wall 20 extending upwardly therefrom. Vertical wall 20 is shown as a weld flange welded to side rail 12.

Figure 2:
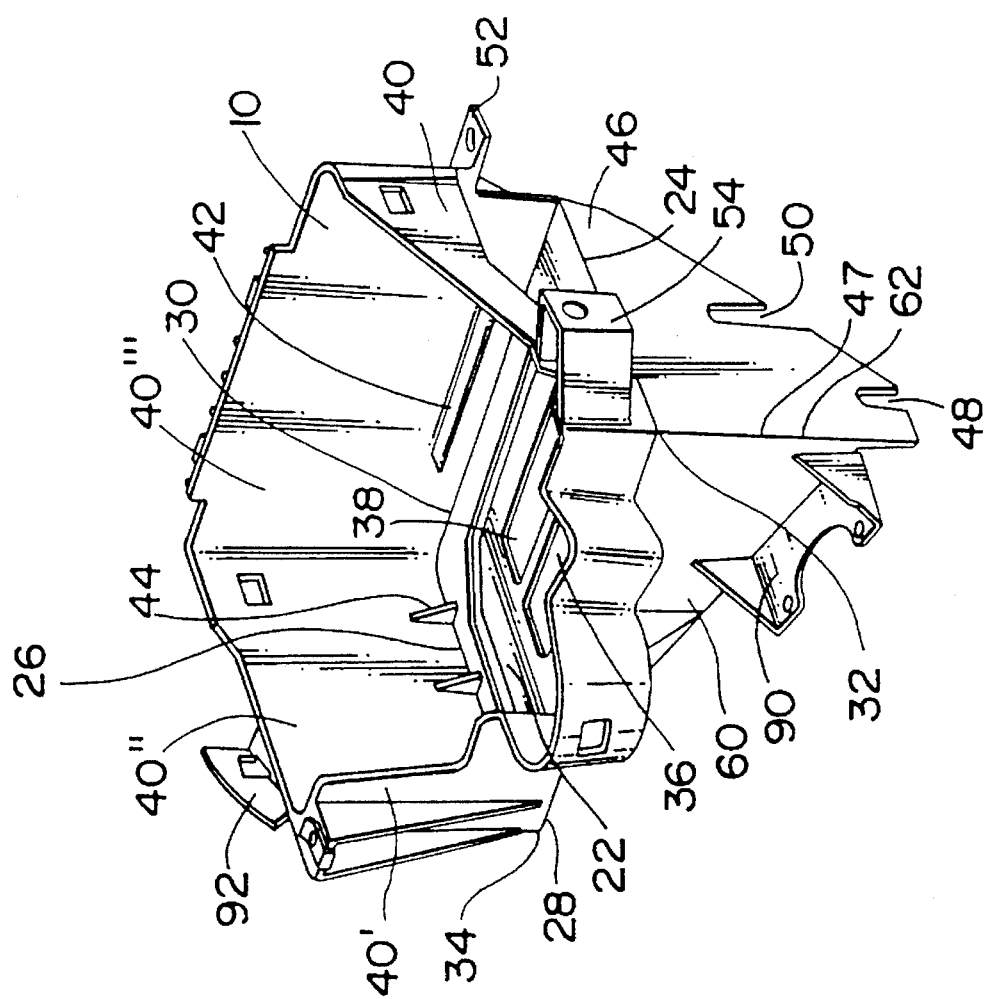
FIG. 2 is a another perspective view of the battery support tray of FIG. 1 shown from a different angle.

As shown in FIGS. 1 and 2, support tray 10 includes base 22 which has outer edge 24 positioned toward the outer side of the engine compartment and for placement adjacent side rail 12, inner edge 26 opposite outer edge 24, front edge 28 to be positioned toward the front of the engine compartment, and rear edge 30 opposite front edge 28. Base 22 further has front-outer corner 32 where front edge 28 and outer edge 24 meet, front-inner corner 34 where front edge 28 and inner edge 26 meet, and apertures 36 and 38 therein.

Support tray 10 further includes side walls 40, 40', 40", and 40''', upwardly extending from base 22. Side wall 40 extends vertically from outer edge 24, side wall 40' extends vertically from front edge 28, side wall 40" extends vertically from inner edge 26, and side wall 40''', extends vertically from rear edge 30. Base 22 and side walls 40, 40', 40", and 40''' define the space in which the automobile battery rests and are preferably designed so that, when a battery is placed on base 22, there is space between the battery and side walls 40—40''' of support tray 10.

Support tray 10 has a locking bar 42 on the inside surface of side wall 40''' and a battery retainer (not shown) near the inside surface of side wall 40' to help secure the battery in place in support tray 10. Support tray 10 further has reinforcement ribs 44 joining base 22 and side wall 40". At the lower rear area of side wall 40 is opening 45, the purpose of which is discussed hereinbelow.

Provided for mounting support tray 10 to side rail 12, support tray 10 has outer bulk head 46 downwardly depending from outer edge 24 of base 22. Although it does not have to be triangular, outer bulk head 46 is a generally thin flat truncated right-angled triangular piece that is adapted to abut against and be attached to vertical surface 14 of side rail 12. Leg 47 of the right-angled triangular outer bulk head 46 is near front-outer corner 32 of base 22, and the hypotenuse of outer bulk head 46 substantially extends from the bottom of leg 47 to rear edge 30 of base 22. The term "substantially extends" is used herein to mean that the element referred to extends at least most of the distance described. For example, the hypotenuse of outer bulk head 46 may extend to or merely near rear edge 30 of base 22. The bottom surface of outer bulk head 46 is angled to correspond to the angle of lower surface 17 of side rail 12. Outer bulk head 46 has two U-shaped slots 48 and 50 in the bottom thereof.

Also provided for mounting support tray 10 to side rail 12 is appendage 52 and arm 54, both integral with side wall 40. Appendage 52 has a hole therethrough and is adapted to be attached to upper surface 16 of side rail 12. Arm 54 also has a hole therethrough and is adapted to rest on upper surface 16 of side rail 12 and to be attached to vertical wall 20 of the engine compartment.

Figure 3:
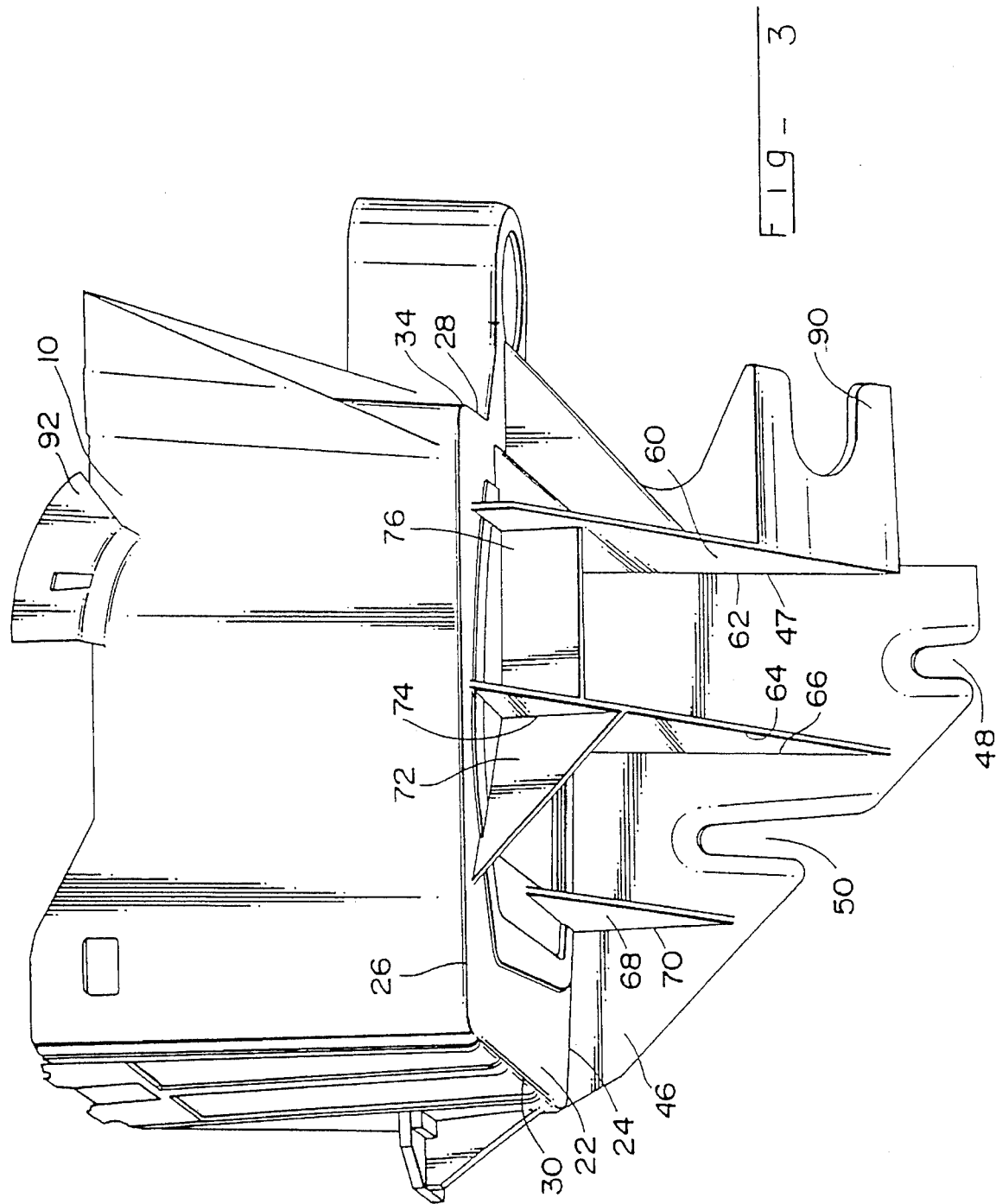
FIG. 3 is a perspective view of the bottom of the battery support tray of FIGS. 1 and 2.

To support the weight of the battery, various ribs and bulk heads are included on the bottom surface of base 22 of support tray 10. FIG. 3 is a perspective view of the bottom of support tray 10 showing the ribs and bulk heads. Front rib 60, also shown in FIGS. 1 and 2, depends downwardly from front edge 28 of base 22. Front rib 60 is a thin flat piece substantially in the shape of a right-angled triangle. Leg 62 of the right-angled triangle depends downwardly from front-outer corner 32 of base 22, and the hypotenuse of the right-angled triangle substantially extends from the bottom of leg 62 to front-inner corner 34 of base 22.

Also downwardly depending from base 22 is intermediate rib 64 parallel with and rearward of front rib 60. Similar to front rib 60, intermediate rib 64 is a thin flat piece substantially in the shape of a right-angled triangle. Leg 66 of the right-angled triangle of intermediate rib 64 depends downwardly from outer edge 24 of base 22, and the hypotenuse of the right-angled triangle substantially extends from the bottom of leg 66 to inner edge 26 of base 22.

Inner rib 68 also downwardly depends from base 22 and is parallel with front and intermediate ribs 60 and 64 and is rearward of intermediate rib 64. Inner rib 68 is a thin flat piece substantially in the shape of a right-angled triangle. Leg 70 of the right-angled triangle of inner rib 68 depends downwardly from outer edge 24 of base 22, and the hypotenuse of the right-angled triangle extends from the bottom of leg 70 to near the middle of base 22.

Supplementary rib 72 also downwardly depends from base 22 and is also a thin flat piece substantially in the shape of a right-angled triangle. Leg 74 of the right-angled triangle of supplementary rib 72 is perpendicular to base 22 and is joined with intermediate rib 64 at about two thirds of the distance from outer edge 24 to inner edge 26 of base 22. Supplementary rib 72 is positioned at about a 45° C. angle to intermediate rib 64. The hypotenuse of the right-angled triangle of supplementary rib 72 extends from the bottom of leg 74 to near the inner edge 26 of base 22.

Inner bulk head 76 downwardly depends from base 22, is substantially parallel with and inward of outer bulk head 46, and bridges front rib 60 and intermediate rib 64. Inner bulk head 76 is a thin flat rectangular piece and is inward of outer bulk head 46. Inner bulk head 76 is about three fourths the distance from outer edge 24 to inner edge 26 of base 22.

Aperture 36 in base 22 is a substantially rectangular aperture and is located between front rib 60, intermediate rib 64, outer bulk head 46, and inner bulk head 76. Aperture 38 in base 22 is also a substantially rectangular aperture and is located between intermediate rib 64, inner rib 68, outer bulk head 46, and supplementary rib 72. Apertures 36 and 38 are located to provide access from above base 22 to U-shaped slots 48 and 50, respectively.

Figure 4:
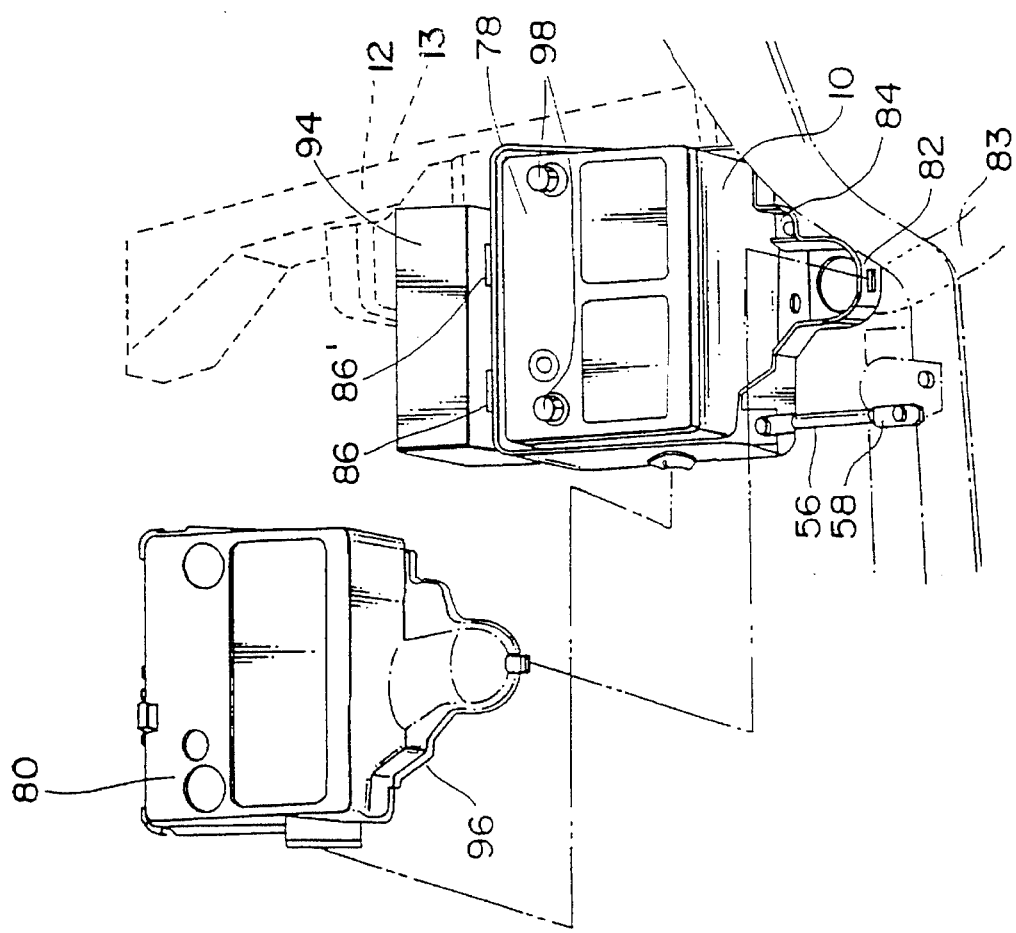
FIG. 4 is an exploded perspective view showing the battery support tray of FIGS. 1 and 2 with a battery support cover.

FIG. 4 shows support tray cover 80 and support tray 10 supporting battery 78. Support tray cover 80 is provided to cover the battery. The dot dash lines indicate the proper placement of support tray cover 80. Support tray cover 80 is sized so that an air gap exists around the sides of the battery to provide a passageway for air to flow around the battery for cooling the battery while the automobile is moving.

Also shown in FIG. 4 is pencil brace 56 which is attached to side wall 40' with a bolt and is attached at end 58 to a crossmember of the automobile. Pencil brace 56 helps protect the battery and support tray 10 from impacts to the automobile.

Support tray 10 has several molded-in or integral attachment structures for attaching various automotive parts to the support tray. Such attachment structures include air intake hose attachment structure 82, battery temperature sensor attachment structure 84, power distribution module attachment structures 86 and 86', support tray cover attachment structures 88, 88' and 88" cruise control servo attachment structure 90, and battery cable attachment structure 92.

An air intake hose 83 (shown in phantom in FIG. 4) may be attached to air intake hose attachment structure 82. During operation of the automobile, outside air enters the open end of the hose, travels through the hose and into the space between the side walls of battery 78 and the side walls of support tray 10 and support tray cover 80, and exits the battery support device through opening 45 in support tray 10. The passing air helps cool the battery while the automobile is moving. In a preferred design of the battery support device, there is little or no space between the upper surface of battery 78 and support tray cover 80, so that little, if any, air flows over the top of battery 78.

A battery temperature sensor connector is attachable to attachment 84 for monitoring the battery temperature and assisting in controlling the timing of the charging of the battery to maintain desired battery temperatures.

Power distribution module 94 is shown attached to attachment structures 86 and 86' in FIG. 4. Support tray 10 thus provides a way of supporting power distribution module 94 in the engine compartment.

Best shown in FIG. 1, support tray cover attachment structures 88, 88' and 88" are generally square holes in side walls 40, 40' and 40", respectively. Support tray cover 80 has fingers (not shown) on the inside surface thereof arranged so that they insert into attachment structures 88 through 88" when support tray cover 80 is attached to support tray 10. Support tray cover 80 has lip 96 around the bottom edge thereof to seal against support tray 10 to reduce air flow through the seam between the two parts.

To mount support tray 10 in the engine compartment of an automobile, two bolts are first loosely secured through the vertical surface of the side rail of an automobile. The bolts are positioned a distance apart to correspond to U-shaped slots 48 and 50 in outer bulk head 46. Support tray 10 is then slid over the two bolts so that the bolts slide into U-shaped slots 48 and 50. The bolt in slot 48 may be tightened by inserting a tool, such as a wrench, through aperture 36. The bolt in slot 50 may be tightened by inserting a similar tool through aperture 38.

Arm 54 is then attached to vertical wall 20 (the weld flange of side rail 12 in FIG. 1) by inserting a bolt through the hole in arm 54 and through vertical wall 20. Appendage 52 is then attached to upper surface 16 of side rail 12 by inserting a bolt through the hole in appendage 52 and through upper surface 16. The design of support tray 10 is such that a person, approaching from one position, can easily mount and attach support tray 10 inside the engine compartment.

The battery is then placed in mounted support tray 10. The battery typically has a lip around the bottom edge thereof and is secured to support tray 10 with locking bar 42 and the battery retainer not shown. Support tray cover 80 is then snapped onto support tray 10. The battery terminals are then placed and tightened onto battery posts 98 in a conventional manner. The tightening of the battery terminals further secures support tray cover 80 to support tray 10.

Support tray 10 and support tray cover 80 are preferably formed by an injection molding technique and are preferably formed of the plastic, polypropylene, most preferably, polypropylene 40% filled with long fiber glass. Suitable fibers of the long fiber glass are about ½ inch in length. A suitable commercial fiber-glass-filled polypropylene is "CELSTRAN", available from Hoechst-Celanese, Inc., Auburn Hills, Mich. Some advantages of using such a plastic to form the battery support device are that the material is resistant to battery acid, no anti-corrosion protection is necessary, and color may be molded into the plastic so that no additional painting is required.

Accordingly, the battery support device of the present invention is useful for supporting and mounting an automobile battery inside the engine compartment of an automobile and is designed so that it allows for a short engine compartment profile by supporting the battery cantilevered off the side rail of the automobile.

The battery support device of the present invention is easy to mount inside the engine compartment with minimum fasteners required, is easy to manufacture, is lightweight, and is capable of having integral attachment structures for attaching parts, such as, temperature sensors and air intake hoses.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A battery support device for supporting a battery in an automobile, the automobile having an engine compartment, the engine compartment having a side and a side rail, the side rail having an upper surface, the upper surface having an outer side toward the side of the engine compartment, the engine compartment further having a vertical wall extending upwardly from the outer side of the upper surface of the side rail, the battery support device comprising:

a one-piece support tray for supporting a battery, the support tray being attachable to the side rail of the automobile so that the battery is cantilevered off the side rail, the support tray having a base having an outer edge for placement adjacent the side rail;

a side wall extending upwardly from the outer edge of the base; and an integral outwardly-extending appendage on the side wall adapted to be attached to the upper surface of the side rail of the automobile.

2. The battery support device of claim 1, wherein the support tray further has an integral outwardly-extending arm on the side wall adapted to be attached to the vertical wall of the engine compartment.

3. The battery support device of claim 1, wherein the base further has an inner edge opposite the outer edge, a front edge, a front-outer corner where the front edge and the outer edge meet, and a front-inner corner where the front edge and the inner edge meet; and the support tray further has a substantially right-angled triangular front rib downwardly depending from the base near the front edge of the base, the substantially right-angled triangular front rib having a leg of the triangle downwardly depending from near the front-outer corner of the base, the front rib substantially extending from the front-outer corner of the base to the front-inner corner of the base.

4. The battery support device of claim 1, wherein the base further has an inner edge opposite the outer edge, a front edge, a rear edge opposite the front edge, a front-outer corner where the front edge and the outer edge meet, and a front-inner corner where the front edge and the inner edge meet;

a substantially right-angled triangular front rib downwardly depending from the base near the front edge of the base, the substantially right-angled triangular front rib having a leg of the triangle downwardly depending from near the front-outer corner of the base, the front rib substantially extending from the front-outer corner of the base to the front-inner corner of the base; and a substantially right-angled triangular intermediate rib downwardly depending from the base rearward of and substantially parallel with the front rib, the substantially right-angled triangular intermediate rib having a leg of the triangle downwardly depending from near the outer edge of the base, the intermediate rib substantially extending from the outer edge of the base to the inner edge of the base.

5. The battery support device of claim 1, wherein the support tray is formed of fiber-glass-filled polypropylene and formed by an injection-molding technique.

6. The battery support device of claim 1, wherein the support tray further has an attachment structure for attaching a part selected from the group consisting of an air intake hose, a battery temperature sensor, a power distribution module, a support tray cover, a cruise control servo, and a battery cable.

7. The battery support device of claim 1, further comprising:

a support tray cover attachable to the support tray for covering the battery, the support tray cover sized so that an air gap exists around the sides of the battery to provide a passageway for air to flow around the battery for cooling the battery; and an attachment structure on the battery support device for attaching an air intake hose to the battery support device.

8. The battery support device of claim 1, wherein the support tray further has an outer bulk head downwardly depending from the outer edge of the base adapted to abut against and be attached to the side rail.

9. The battery support device of claim 8, wherein the outer bulk head has a U-shaped slot in the bottom to be used in attaching the battery support device to the side rail of the automobile.

10. A battery support device for supporting a battery in an automobile, the automobile having an engine compartment, the engine compartment having a side and a side rail, the side rail having an upper surface, the upper surface having an outer side toward the side of the engine compartment, the engine compartment further having a vertical wall extending upwardly from the outer side of the upper surface of the side rail, the battery support device comprising:

- a one-piece support tray for supporting a battery, the support tray being attachable to the side rail of the automobile so that the battery is cantilevered off the side rail, the support tray having
- a base having an outer edge for placement adjacent the side rail and an inner edge opposite the outer edge;
- an outer bulk head downwardly depending from the outer edge of the base adapted to abut against and be attached to the side rail; and
- an inner bulk head downwardly depending from the base, the inner bulk head being substantially parallel with the outer bulk head and inward of the outer bulk head.

11. A battery support device for supporting a battery in an automobile, the automobile having an engine compartment, the engine compartment having a side and a side rail, the side rail having an upper surface, the upper surface having an outer side toward the side of the engine compartment, the engine compartment further having a vertical wall extending upwardly from the outer side of the upper surface of the side rail, the battery support device comprising:

- a one-piece support tray for supporting a battery, the support tray being attachable to the side rail of the automobile so that the battery is cantilevered off the side rail, the support tray having
- a base having an outer edge for placement adjacent the side rail; and
- an outer bulk head downwardly depending from the outer edge of the base adapted to abut against and be attached to the side rail, the outer bulk head having a U-shaped slot in the bottom to be used in attaching the battery support device to the side rail of the automobile,
- the base having an aperture therein to provide access to the U-shaped slot in the outer bulk head.

12. A battery support device for supporting a battery in an automobile, the automobile having an engine compartment, the engine compartment having a side, and a side rail, the side rail having an upper surface, the upper surface having an outer side toward the side of the engine compartment, the engine compartment further having a vertical wall extending upwardly from the outer side of the upper surface of the side rail, the battery support device comprising:

- a one-piece support tray for supporting a battery, the support tray being attachable to the side rail of the automobile so that the battery is cantilevered off the side rail, the support tray having
  - a base having an outer edge for placement adjacent the side rail, an inner edge opposite the outer edge, a front edge, a rear edge opposite the front edge, a front-outer corner where the front edge and the outer edge meet, and a front-inner corner where the front edge and the inner edge meet;
  - a substantially right-angled triangular front rib downwardly depending from the base near the front edge of the base, the substantially right-angled triangular front rib having a leg of the triangle downwardly depending from near the front-outer corner of the base, the front rib substantially extending from the front-outer corner of the base to the front-inner corner of the base;
  - a substantially right-angled triangular intermediate rib downwardly depending from the base rearward of and substantially parallel with the front rib, the substantially right-angled triangular intermediate rib having a leg of the triangle downwardly depending from near the outer edge of the base, the intermediate rib substantially extending from the outer edge of the base to the inner edge of the base;
  - an outer bulk head downwardly depending from the outer edge of the base adapted to abut against and be attached to the side rail;
  - a side wall extending upwardly from the outer edge of the base;
  - an integral outwardly-extending appendage on the side wall adapted to be attached to the upper surface of the side rail of the automobile; and
  - an integral outwardly-extending arm on the side wall adapted to be attached to the vertical wall of the engine compartment.

13. The battery support device of claim 12, wherein the support tray further includes an inner bulk head downwardly depending from the base, the inner bulk head being substantially parallel with the outer bulk head and inward of the outer bulk head.

14. The battery support device of claim 12, wherein the support tray is formed of fiber-glass-filled polypropylene and formed by an injection-molding technique.

15. The battery support device of claim 12, wherein the support tray further comprises an attachment structure for attaching a part selected from the group consisting of an air intake hose, a battery temperature sensor, a power distribution module, a support tray cover, a cruise control servo, and a battery cable.

16. The battery support device of claim 12, further comprising:

- a support tray cover attachable to the support tray for covering the battery, the support tray cover sized so that, when a battery is enclosed in the battery support device and the support tray cover is attached to the support tray, an air gap exists around the battery to provide a passageway for air to flow around the sides of the battery for cooling the battery; and
- an attachment structure on the battery support device for attaching an air intake hose to the battery support device.

17. The battery support device of claim 12, wherein the outer bulk head has a U-shaped slot in the bottom to be used in attaching the battery support device to the side rail of the automobile.

18. The battery support device of claim 17, wherein the base has an aperture therein to provide access to the U-shaped slot in the outer bulk head.

19. A battery support device for supporting a battery in an automobile, the automobile having an engine compartment, the engine compartment having a side, and a side rail, the side rail having an upper surface, the upper surface having an outer side toward the side of the engine compartment, the engine compartment further having a vertical wall extending upwardly from the outer side of the upper surface of the side rail, the battery support device comprising:

a one-piece support tray for supporting a battery, the support tray being attachable to the side rail of the automobile so that the battery is cantilevered off the side rail, the support tray having:
- a base having an outer edge for placement adjacent the side rail, an inner edge opposite the outer edge, a front edge, a rear edge opposite the front edge, a front-outer corner where the front edge and the outer edge meet, and a front-inner corner where the front edge and the inner edge meet;
- a substantially right-angled triangular front rib downwardly depending from the base near the front edge of the base, the substantially right-angled triangular front rib having a leg of the triangle downwardly depending from near the front-outer corner of the base, the front rib substantially extending from the front-outer corner of the base to the front-inner corner of the base;
- a substantially right-angled triangular intermediate rib downwardly depending from the base rearward of and substantially parallel with the front rib, the substantially right-angled triangular intermediate rib having a leg of the triangle downwardly depending from near the outer edge of the base, the intermediate rib substantially extending from the outer edge of the base to the inner edge of the base;
- an outer bulk head downwardly depending from the outer edge of the base adapted to abut against and be attached to the side rail, the outer bulk head having a U-shaped slot in the bottom thereof;
- the base further having an aperture therein to provide access to the U-shaped slot in the outer bulk head;
- a side wall extending upwardly from the outer edge of the base;
- an integral outwardly-extending appendage on the side wall adapted to be attached to the upper surface of the side rail of the automobile; and
- an integral outwardly-extending arm on the side wall adapted to be attached to the vertical wall of the engine compartment.

* * * * *